United States Patent [19]

Kramer et al.

[11] Patent Number: 4,885,346
[45] Date of Patent: Dec. 5, 1989

[54] MIXTURE CONTAINING DICYANATE OR POLYCYANATE COMPOUND, SUBSTITUTED BICYCLO[2.2.1]HEPT-5-ENE-2,3-DICARBOXIMIDE AND THERMOPLASTIC

[75] Inventors: Andreas Kramer, Düdingen; Francis Perritaz, Bulle, both of Switzerland

[73] Assignee: Ciba-Geigy Corporation, Ardsley, N.Y.

[21] Appl. No.: 279,883

[22] Filed: Dec. 5, 1988

[30] Foreign Application Priority Data

Dec. 17, 1987 [CH] Switzerland .................. 4925/87

[51] Int. Cl.$^4$ .................. C08L 79/08; C08L 81/02; C08L 81/06
[52] U.S. Cl. .................. 525/426; 525/391; 525/397; 525/436; 525/535; 525/539; 528/322; 528/422
[58] Field of Search .............. 525/426, 436, 391, 397, 525/535, 539; 528/322, 422

[56] References Cited

U.S. PATENT DOCUMENTS

| | | | |
|---|---|---|---|
| 3,105,839 | 10/1963 | Renner | 260/346.3 |
| 4,370,467 | 1/1983 | Gaku et al. | 528/322 |
| 4,666,997 | 5/1987 | Renner et al. | 525/502 |
| 4,745,166 | 5/1988 | Renner et al. | 526/259 |

OTHER PUBLICATIONS

D. A. Shimp et al., Inter. SAMPE Tech. Conf., Oct. 7-9, 1986, pp. 859-862.

Primary Examiner—Harold D. Anderson
Attorney, Agent, or Firm—Luther A. R. Hall

[57] ABSTRACT

Heat curable mixtures comprising
(a) 5 to 95% by weight of at least one aromatic dicyanate or polycyanate compound or a prepolymer thereof,
(b) 95 to 5% by weight of at least one compound of formula I or II

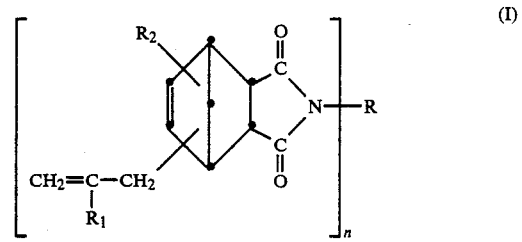

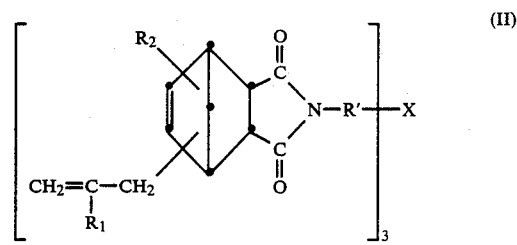

or of a prepolymer of a compound of formula I or II,
(c) 0 to 50% by weight, based on the sum of (a)+(b), of at least one compound of formula III

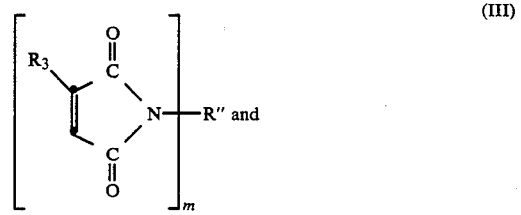

(d) 0.1 to 50% by weight, based on the sum of (a)+(b), of at least one thermoplastic having a glass transition temperature of at least 120° C., in which formulae above $R_1$, $R_2$ and $R_3$ are each independently of one another a hydrogen atom or methyl, n is 1 or 2 and m is 2 or 3, R is hydrogen or an aliphatic, cycloaliphatic or aromatic radical, R' is an aliphatic radical, m- or p-phenylene or m- or p-phenyleneoxy, and R" is an organic radical or valency m containing 2 to 30 carbon atoms, are suitable for the production of mouldings such as prepregs or composites, coatings and bonds.

11 Claims, No Drawings

MIXTURE CONTAINING DICYANATE OR POLYCYANATE COMPOUND, SUBSTITUTED BICYCLO[2.2.1]HEPT-5-ENE-2,3-DICARBOXIMIDE AND THERMOPLASTIC

The present invention relates to heat curable mixtures containing dicyanate or polycyanate compounds, substituted bicyclo[2.2.1]hept-5-ene-2,3-dicarboximides and thermoplastics, and to the moulded materials obtained from said mixtures by curing.

Mixtures of polycyanate compounds and polymaleimides which can be cured catalytically are disclosed in German Offenlegungsschrift No. 3 026 017.

Heat curable mixtures of substituted bicyclo[2.2.1]hept-5-ene-2,3-dicarboximides and polymaleimides are disclosed in European patent application No. 0 175 648.

These prior art mixtures are only moderately soluble in organic solvents and the compositions prepared by fusing them demix when they are cooled again to room temperature.

At the 18th International SAMPE Conference held from 7th–9th Oct., 1986, 851–862, D. A. Shimp et al. reported on properties of mixtures of triazine resins and thermoplastics. It has been found that mixtures of dicyanate or polycyanate compounds, substituted bicyclo[2.2.1]hept-5-ene-2,3-dicarboximides and thermoplastics are readily processable, are suitable for melt impregnation as well as readily soluble in organic solvents, and that the mixtures prepared in the melt are stable at room temperature, i.e., they do not demix.

Accordingly, the present invention relates to heat curable mixtures comprising (a) 5 to 95% by weight of at least one aromatic dicyanate or polycyanate compound or a prepolymer thereof.

(b) 95 to 5% by weight of at least one compound of formula I or II

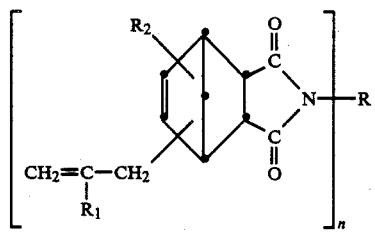

(I)

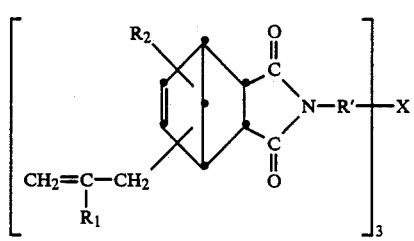

(II)

or of a prepolymer of a compound of formula I or II, (c) 0 to 50% by weight, based on the sum of (a)+(b), of at least one compound of formula III

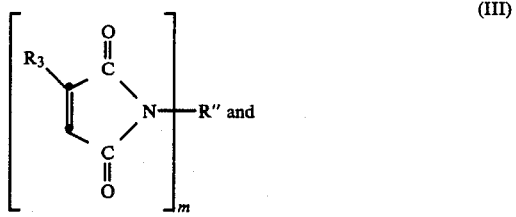

(III)

(d) 0.1 to 50% by weight, based on the sum of (a)+(b), of at least one thermoplastic having a glass transition temperature of at least 120° C., in which formulae above $R_1$, $R_2$ and $R_3$ are each independently of one another a hydrogen atom or methyl, n is 1 or 2 and m is 2 or 3, R, if n is 1, is a hydrogen atom, $C_1$–$C_{12}$alkyl, $C_3$–$C_6$alkenyl, $C_5$–$C_8$cycloalkyl, $C_6$–$C_{10}$aryl or benzyl, or, if n is 2, is —$C_pH_{2p}$—, in which p is 2 to 20, $C_6$–$C_{10}$arylene or a group of formula IV

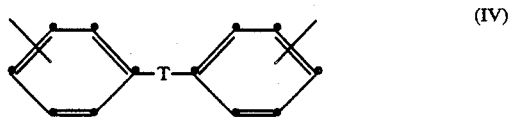

(IV)

wherein T is methylene, isopropylidene, CO, O, S or $SO_2$,

X is

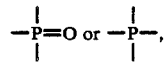

R' is —$C_qH_{2q}$—, in which q is 2 to 20, —$C_rH_{2r}$—O—, in which r is 2 to 6, m- or p-phenylene, m- or p-phenylenoxy, the oxygen atom being attached to the group X, and R'' is an organic radical of valency m containing 2 to 30 carbon atoms.

The mixtures of the present invention preferably comprise 20 to 80% by weight of component (a), 80 to 20% by weight of component (b), 0 to 30% by weight of component (c), based on the sum of (a)+(b), and 5 to 40% by weight of component (d), based on the sum of (a)+(b).

Most preferably, the mixture of the present invention comprise 20 to 60% by weight of component (a), 40 to 80% by weight of component (b), and 10 to 30% by weight of component (d).

The aromatic dicyanate or polycyanate compounds present in the mixtures of this invention as component (a) are known and some are commercially available. For example, dicyanate or polycyanate compounds which may be suitably used are those of formula V

(V)

wherein R''' is a radical having one or more aromatic nuclei which is derived from dihydric or polyhydric, mononuclear or polynuclear unsubstituted or substituted phenols by removal of the OH groups, and wherein each cyanate group is attached direct to an aromatic nucleus, and y is an integer from 2 to 10. Examples of suitable substituents are alkyl groups, alkoxy groups, alkenyl groups, halogen atoms, preferably chlorine or bromine atoms, and nitro groups.

Representative examples of suitable dicyanate or polycyanate compounds are: dicyanatobenzene, 1,3,5-tricyanatobenzene, 1,3-, 1,4-, 1,6-, 1,8- 2,6- or 2,7-dicyanatonaphthalene, 1,3,6-tricyanatonaphthalene, 4,4'-dicyanatobiphenyl, bis(4-cyanatophenyl)methane, 2,2-bis(4-cyanatophenyl)propane, 2,2-bis(3,5-dichloro-4-cyanatophenyl)propane, 2,2-bis(3,5-dibromo-4-dicyanatophenyl)propane, bis(4-cyanatophenyl)ether, bis(4-cyanatophenyl)thioether, bis(4-cyanatophenyl)sulfone, tris(4-cyanatophenyl)phosphite, tris(4-cyanatophenyl)phosphate, bis(3-chloro-4-cyanatophenyl)methane and cyanated novolaks.

The dicyanate and polycyanate compounds of formula V can be prepared, for example, by the process disclosed in German Offenlegunsschrift No. 2 529 486, by reacting di- or poly(trialkylammonium)phenolates of di- or polyfunctional phenols with a cyanogen halide, preferably cyanogen chloride or cyanogen bromide, in the presence of a trialkylamine. Such phenolates can be derived, for example, from the following phenols of formulae VI to VIII

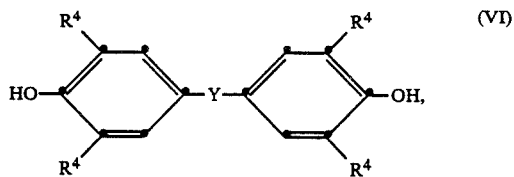
(VI)

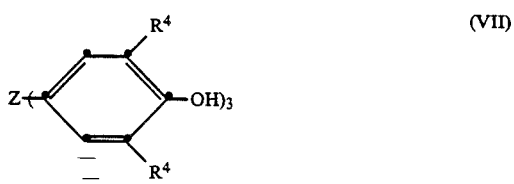
(VII)

and

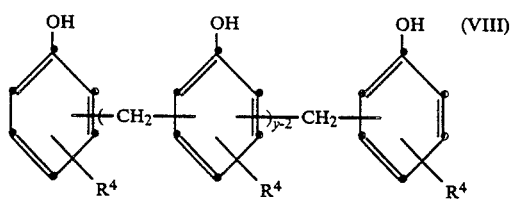
(VIII)

wherein $R^4$ is a hydrogen or halogen atom, alkyl of 1 to 9 carbon atoms, alkenyl of up to 4 carbon atoms or alkoxy of 1 to 4 carbon atoms, Y is a single bond, alkylene of up to 5 carbon atoms, cycloalkylene, preferably cyclohexylene, $-SO_2-$, $-SO-$, $-S-$, $-CO-$, $-OCO-O-$, $-O-$ or $-CH_2OCH_2-$, Z is

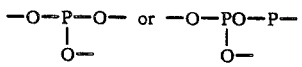

and Y is an integer from 2 to 10.

The prepolymers of dicyanate or polycyanate compounds present as component (a) in the mixtures of this invention are obtained by polymerisation of the cyanate compounds in the presence of an acid, for example a mineral or Lewis acid, a base such as sodium hydroxide, a sodium alcoholate, a tertiary amine or a salt such as sodium carbonate or lithium chloride as catalyst, and preferably have an average molecular weight of not less than 400 and not more than 6000.

The mixtures of the present invention may also contain, as component (a), mixtures of dicyanate or polycyanate compounds with the corresponding prepolymers. For example, many of the commercially available dicyanate compounds which are derived from bisphenols and a cyanogen halide contain some of the corresponding prepolymers.

Component (a) of the mixtures of this invention is preferably a dicyanate compound or a mixture thereof with the corresponding prepolymer.

In the compounds of formula I, R may be a straight chain or branched $C_1-C_{12}$ alkyl group such as methyl, ethyl, isopropyl, n-butyl, isopentyl, n-hexyl, 2-ethyl-n-hexyl, n-decyl and n-dodecyl, but is preferably $C_1-C_8$alkyl. R as $C_3-C_6$ alkenyl may also be straight chain or branched and is for example allyl, methallyl, 2-butenyl and 3-hexenyl, with allyl being preferred. A cycloalkyl group R may be a cyclopentyl, cyclohexyl, cycloheptyl or cyclooctyl group, with cyclohexyl being preferred.

An aryl group R may be unsubstituted phenyl or a phenyl group which is substituted by one or two methyl groups, and is e.g. tolyl or xylyl or is also naphthyl. Preferably R is a phenyl group. R as a $-C_pH_{2p}-$ group may be a straight chain or branched radical such as ethylene, propylene, trimethylene, tetramethylene, hexamethylene, octamethylene and dodecamethylene. Preferably R is a $-(CH_2)_p-$ group in which p is 2 to 12. A group of formula IV represented by R is preferably attached in the 4,4'-position to the N-atoms.

R as a $C_6-C_{10}$arylene group may be a m-phenylene, p-phenylene, 1,3-naphthylene, 1,4-naphthylene, 1,5-naphthylene or 2,6-naphthylene group.

If R is a group of the formula III, T is preferably the methylene group, $-O-$ or $-SO_2-$.

Preferred compounds of formula I are those wherein each of $R_1$ and $R_2$ is a hydrogen atom and R, if n is 1, is hydrogen, $C_1-C_8$alkyl, allyl, cyclohexyl, phenyl or benzyl; or, if n is 2, R is $-(CH_2)_p-$, in which p is 2 to 12, m- or p-phenylene, or is a group of formula IV, wherein T is the methylene group, $-O-$or $-SO_2-$.

Particularly preferred compounds of formula I are those wherein each of $R_1$ and $R_2$ is a hydrogen atom and R, if n is 1, is allyl or, if n is 2, is $-(CH_2)_6-$ or

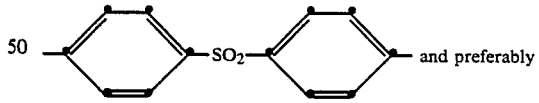 and preferably

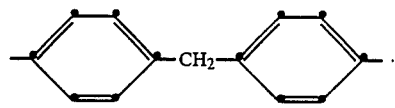.

Most preferably, the mixtures of this invention contain, as component (b): N-allyl-allylbicyclo[2.2.1]hept-5-ene-2,3-dicarboximide, bis[4-(allylbicyclo)[2.2.1]hept-5-ene-2,3-dicarboximidophenyl)]methane or N,N'-hexamethylene-bis(allylbicyclo[2.2.1]hept-5-ene-2,3-dicarboximide), or a mixture of these compounds.

Examples of specific compounds of formula I are:
N-methyl-allylbicyclo[2.2.1]hept-5-ene-2,3-dicarboximide,
N-allyl-allylbicyclo[2.2.1]hept-5-ene-2,3-dicarboximide, N-(2-ethylhexyl)-allylbicyclo[2.2.1]hept-5-ene-2,3-dicarboximide, N-cyclohexyl-allylbicyclo[2.2.1]hept-5-ene-2,3-dicarboximide, N-phenyl-allylbicyclo[2.2.1]hept-5-ene-2,3-dicarboximide, N-benzyl-allylbicyclo[2.2.1]hept-5-ene-2,3-dicarboximide, N,N'-ethylene-bis(allylbicyclo[2.2.1]hept-5-ene-2,3-dicarboximide), N,N'-hexamethylene-bis(allylbicyclo[2.2.1]hept-5-ene-2,3-dicarbox-imide), N,N'-dodecamethylene-bis(allylbicyclo[2.2.1]hept-5-ene-2,3-dicarboximide), bis]4-(allylbicyclo[2.2.1]hept-5-ene-2,3-dicarboximidophenyl)]methane, bis[4-(methallylbicyclo[2.2.1]hept-5-ene-2,3-dicarboximidophenyl)]methane, N,N'-p-phenylene-bis(allylbicyclo[2.2.1]hept-5-ene-2,3-dicarboximide), bis[4-(allylbicyclo[2.2.1]hept-5-ene-2,3-dicaroximidophenyl)]ether, bis[4-(allylbicyclo[2.2.1]hept-5-ene-2,3-dicarboximidophenyl)sul-fone, N-allyl-allylmethylbicyclo[2.2.1]hept-5-ene-2,3-dicarboximide, N-(2-ethylhexyl)-allylmethylbicyclo[2.2.1]hept-5-ene-2,3-dicarboximide, N-phenyl-allylmethylbicyclo[2.2.1]hept-5-ene-2,3-dicarboximide, N,N'-hexamethylene-bis(allylmethylbicyclo[2.2.1]hept-5-ene-2,3-dicarboximide), bis[4-(allylmethylbicyclo[2.2.1]hept-5-ene-2,3-dicarboximidophenyl)methane, and bis[4-(methyllylmethylbicyclo[2.2.1]hept-5-ene-2,3-dicarboximidophenyl)]sulfone.

The imides of formula I can be prepared in a manner known per se, for example by the process described in European patent application No. 105 024, by reacting an anhydride of formula IX

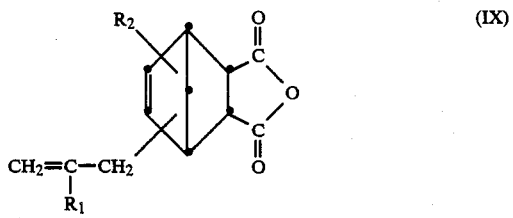

with a compound of formula X

wherein R, $R_1$, $R_2$ and n are as defined for formula I, at elevated temperature, while distilling off the water of reaction. Where the compound of formula X is ammonia or a low boiling monoamine, it is advisable to use an excess of this reactant. Diamines will conveniently be employed in stoichiometric proportion. The reaction can be carried out without a solvent or in the presence of an inert solvent suitable for removing the water as an azeotrope (entrainer). The reaction temperature can be in the range from 100° to 250° C.

R' as —$C_qH_{2q}$— or —$C_rH_{2r}O$— in the compounds of formula II can be straight chain or branched alkylene or alkyleneoxy groups. Typical examples of such groups are: 1,2-ethylene, 1,3- and 1,2-propylene, tetramethylene, pentamethylene, 2,2-dimethyl-1,3-propylene, hexamethylene, heptamethylene, octamethylene, decamethylene, dodecamethylene, tetradecamethylene, pentadecamethylene, hexadecamethylene, octadecamethylene and eicosylene; ethyleneoxy, n-propyleneoxy, 1,2-propyleneoxy, n-butyleneoxy, n-pentyleneoxy and n-hexyleneoxy. Straight chain groups —$C_qH_{2q}$— or —$C_rH_{2r}$—O—, in which q is 2 to 6, in particular 2 to 4 carbon atoms, and r is 2 to 4 carbon atoms, are preferred.

$R_1$ and $R_2$ in formula II are each preferably a hydrogen atom. Particularly preferred compounds of formula II are those in which R' is —$(CH_2)_q$—, in which q is 2 to 4, m- or p-phenylene or m- or p-phenyleneoxy.

The compounds of formula II can be prepared in a manner known per se by reacting a compound of formula XI

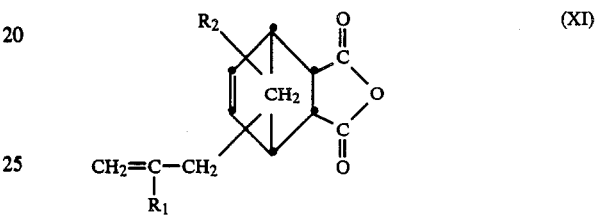

with a compound of the formula XII

wherein $R_1$, $R_2$, R' and X are as defined above, at elevated temperature, with removal of the water formed during the reaction by distillation.

The reaction can be carried out without a solvent or in the presence of an inert solvent which can be used for the azeotropic removal of the water (entrainer such as toluene and xylenes). The temperature range for the reaction in the presence of a solvent can be from 100° C. to reflux temperature. The reaction in the melt is conveniently carried out under atmospheric pressure in the temperature range from 100° to 250° C., preferably from 130° to 220° C. The reaction in the presence of an inert solvent is preferred.

Compounds of formula II, wherein X is

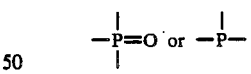

and R' is —$C_rH_{2r}$—O— or m- or p-phenyleneoxy, can also be obtained by a modified process by reacting a compound of formula XIII

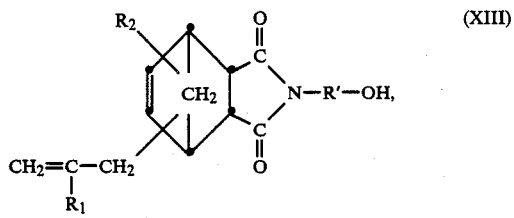

wherein $R_1$ and $R_2$ are as defined for formula II and R' is —$C_rH_{2r}$—O— or m- or p-phenyleneoxy, with a phosphorus oxyhalide of phosphorus trihalide, preferably phosphorus oxychloride, phosphorus tribromide or phosphorus trichloride, in a molar ratio of at least 1:3 in the presence of a base.

Examples of suitable bases are tertiary amines such as triethylamine, tri-n-butylamine, pyridine an dimethylaniline. This reaction is advantageously carried out in an inert organic solvent, such as toluene or xylenes, in the temperature range from −50° C. to +50° C., preferably from 0°–30° C.

On occasion, the concomitant use of an antioxidant in the above reactions carried out in the presence of an inert solvent may be advantageous.

The compounds of formulae XI, XiI and XIII are known or can be prepared by methods which are known per se. Compounds of formula XI can be obtained, for example, by the process described in U.S. Pat. No. 3 105 839, by reacting sodium cyclopentadienide or sodium methylcyclopentadienide with an allyl or methally halide, followed by a Diels-Alder reaction with maleic anhydride. Although the U.S. patent specification states that the allyl group is bonded in the 7-position of the bicyclic system, more recent investigations have shown that an isomer mixture is formed with respect to the position of the allyl or methallyl group (in the 1- and 6-position) and also of the endo- and exo-configuration of the anhydride portion. Compounds of formula XIII can be prepared by reaction of an anhydride of formula XI with the corresponding aminoalcohols H₂N—R′—OH, which reaction is likewise carried out at elevated temperature with removal of the water formed during the reaction by distillation.

Compounds of formula XII, wherein X is

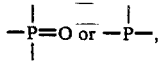

can be obtained, for example, by reacting aminoalcohols H₂H—R′—OH with phosphorus oxyhalides or phosphorus trihalides. The prepolymers of compounds of formula I or II can be obtained by heating a compound of formula I or II in the temperature range from 180° to 220° C. for up to five hours.

In the compounds of formula III, suitable organic radicals R″, in which m is 2, are —$C_pH_{2p}$—, in which p is 2-20, preferably —$(CH_2)_p$—, in which p is 2-12, —CH₂CH₂SCH₂CH₂—, C₆-C₁₀arylene, xylylene, cyclopentylene, cyclohexylene, 1,4-bis(methylene)cyclohexylene, the radical of bicyclohexylmethane or radicals of formulae XIV or XV

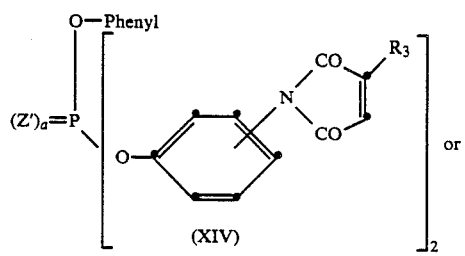

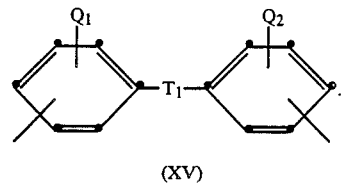

If m is 3, R″ is, for example, a radical of formula XVI

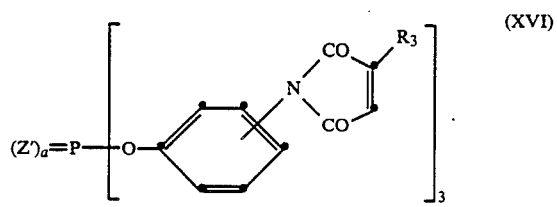

In the above formulae XIV to XVI, T₁ is methylene, isopropylidene, CO, O, S, SO₂, —P=O(Q₃), NQ₃—(Q₃=C₁-C₄alkyl), —N=N—, —CONH—, —COO—, —NQ₃—CO—X′—CO—NQ₃—, O—CO—X′—CO—O—,

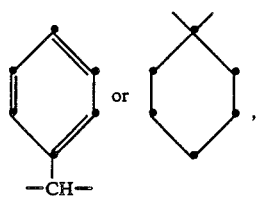

a is 0 or 1,
Z′ is O or S,
Q₁ and Q₂ are each independently of the other a halogen atom, preferably a chlorine or bromine atom, methyl or ethyl or, in particular, a hydrogen atom,
X′ is a direct bond, —$C_bH_{2b}$—, in which b is 1–12, C₆-C₁₀arylene, xylylene, cyclopentylene or cyclohexylene, and R₃ is as defined above.

Specific exmaples of maleimides of formula III which the mixtures of this invention may contain are:
N,N′-ethylenebismaleimide,
N,N′-hexamethylenebismaleimide,
N,N′-m-phenylenebismaleimide,
N,N′-p-phenylenebismaleimide,
N,N′-4,4′-diphenylmethanebismaleimide,
N,N′-4,4′-3,3′-dichlorodiphenylmethanebismaleimide,
N,N′-4,4′-diphenyl ether bismaleimide,
N,N′-4,4′-diphenylsulfonebismaleimide,
N,N′-m-xylylenebismaleimide,
N,N′-p-xylylenebismaleimide,
N,N′-4,4′-2,2-diphenylpropanebismaleimide,
the N,N′-bismaleimide of 4,4′-diaminotriphenylphosphate,
the N,N′-bismaleimide of 4,4′-diaminotriphenylphosphite,
the N,N′-bismaleimide of 4,4′-diaminotriphenylthiophosphate,
the N,N′,N″-trismaleimide of tris(4-aminophenyl)phosphate,
the N,N′,N″-trismaleimide of tris(4-aminophenyl)phosphite and the N,N′,N″-trismaleimide of tris(4-aminophenyl)thiophosphate.

Preferred compounds of formula III are those wherein m is 2, $R_3$ is a hydrogen atom and R′ is —$(CH_2)_p$—, in which p is 2 to 12, or is m- or p-phenylene, m-or p-xylylene, 1,4-cyclohexylene, 1,4-bis(methylene)cy-clohexylene, the radical of 4,4′-biscyclohexylmethane and, in particular, a radical of formula XV which is attached to the nitrogen atoms in the 4,4′-position, wherein each of $Q_1$ and $Q_2$ is a hydrogen atom and $T_1$ is O, $CH_2$ or $SO_2$. The most preferred compound of formula II is N,N′,4,4′-diphenylmethanebismaleimide.

Thermoplastics (d) suitable for use in the mixtures of this invention are all those known polymers which have a glass transition temperature of at least 120° C. and are miscible with the mixture of polycyanates and dicarboximides. By virtue of their properties, suitable thermoplastics are preferably polyimides, polyether imides, polyamide imides, polysulfones, polyether sulfones or polyether ketones. Among these thermoplastics, those having a glass transition temperature in the range from 150° to 350° C., more particularly from 70° to 320° C., are preferred.

If the thermoplast (d) is a polysulfone, suitable compounds are, for example, those containing the repeating unit of formula $$—A—SO_2—$$

wherein A is a divalent aromatic group which may be interrupted by ether oxygen atoms and/or divalent aliphatic groups.

The polysulfones can be obtained in known manner, for example by heating either (a) a sulfonyl halide of formula $HA_1SO_2X_1$ or (b) a mixture of a disulfonyl halide of formula $XSO_2A_1SO_2X_1$ with a compound of formula $HA_2H$ that does not contain a sulfonyl halide, wherein $A_1$ and $A_2$ are identical or different and are each a divalent aromatic group which may be interrupted by ether oxygen atoms and/or divalent aliphatic groups and X is a chlorine or bromine atom, in an inert solvent in the presence of a Lewis acid catalyst. The polysulfones obtained by process (a) contain the repeating unit $$—A_1—SO_2—,$$

whereas the polysulfones prepared by process (b) contain the repeating unit $$—A_1—SO_2—A_2—SO_2—$$

Polysulfone resins which are preferably used in the mixtures of this invention are those which contain ether groups in the repeating unit but lack hydroxyl groups in the side chains. These polysulfones are in particular those containing a repeating unit of formula $$—OA_3OA_4SO_2A_4—,$$

in which $A_3$ and $A_4$ are divalent arylene groups, preferably phenylene groups, which can be substituted by chlorine or $C_1$-$C_4$alkyl groups, for example methyl groups. Polysulfones of this kind are obtained in known manner by reaction of a dialkali metal salt of a dihydric phenol of formula $HOA_3OH$ with a bis(monochloroaryl)sulfone of formula $ClA_4SO_2A_4Cl$ in dimethyl sulfoxide. More preferred sulfone resins are those containing a repeating unit of formula $$—OA_5—Y—A_5OA_6—SO_2—A_6—$$

in which $A_5$ and $A_6$ are each a phenylene group which is unsubstituted or substituted by chlorine or $C_1$-$C_4$alkyl groups, for example methyl groups, and Y is a carbon-carbon bond or is a —$SO_2$— or an aliphatic hydrocarbon group, preferably one that contains not more than four carbon atoms, for example a group of formula $$—CH_2— \quad \text{or} \quad —\underset{\underset{CH_3}{|}}{\overset{\overset{CH_3}{|}}{C}}—$$

Particularly preferred thermoplastic polysulfone resins are those which contain the repeating units of formula XVII

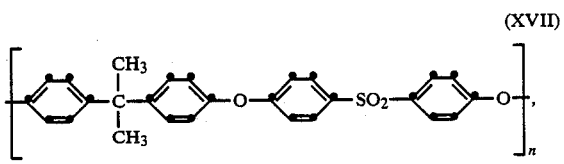

in which n has preferably an average value of 50–120.

Particularly useful polysulfones are, for example, the compounds available from Union Carbide Corporation under the name "Polysulfone P2300" which, according to the data supplied by the manufacturer, has a molecular weight range of 30,000–50,000, which implies that the substance contains on average about 68–113 repeating units of the formula XVII per molecule, and also a similar substance available from Union Carbide Corportation under the name "Polysulfone P3500" which, according to the data supplied by the manufacturer, has a molecular weight range which is between that of "Polysulfone Udel P1800" and that of "Polysulfone P2300"; its molecular weight is about 35,000.

In the practice of this invention it is also possible to use mixtures of two or more thermoplastics as component (d).

Particularly suitable thermoplastics (d) are polyimides such as the polyimides containing phenylindane units described, for example, in U.S. Pat. No. 3 856 752 and EP-A 92 524, the homopolyimides and copolyimides consisting of at least one aromatic tetracarboxylic acid and at least one aromatic diamine disclosed, for example, in U.S. Pat. No. 4 629 777, and the homopolyimides and copolyimides described, for example, in EP-A 162 017, EP-A 181 837 and in U.S. Pat. No. 4 629 685.

Further preferred thermoplastics (d) are polyether imides, for example the products sold by General Electric under the registered trademark Ultem ® (for example Ultem ® 1000), or the polyether imides disclosed in U.S. Pat. No. 4 196 144. Further preferred thermoplastics are polyether sulfones, for example Victrex PES 100 P available from ICI or Udel P 1800 available from Amoco, or those disclosed in U.S. Pat. No. 4 667 010.

Examples of suitable polyamide imides are the compounds disclosed in U.S. Pat. Nos. 3 894 114, 3 948 835, 3 926 911 and 3 950 408.

The mixtures of the present invention can be prepared in a manner known per se by grinding and blending or by mixing them in an inert organic solvent, for example dichloromethane or dimethyl formamide, or by fusing the components by mixing components (a), (b) and (d) with the optional component (c) and fusing them in the temperature range from 100° to 180° C. Preparation is preferably effected by dissolving the components in an organic solvent, the procedure being that components (a) and (b) together with optional component (c) and component (d) are dissolved, with or without heating, and the solvent is subsequently removed by distillation, preferably on a rotary evaporator.

The mixtures of the invention may also contain conventional modifiers such as fillers, plasticisers, pigments, dyes, mould release agents or flame retardants.

The processing of the mixtures of the invention can, if desired, be carried out in the presence of a curing catalyst.

Examples of suitable inert organic solvents are N,N-dimethylformamide, N,N-dimethylacetamide, N-methylpyrrolidone, methylene dichloride, acetone, toluene, xylenes, methyl ethyl ketone and ethylene glycol monoalkyl or dialkyl ethers containing 1 to 4 carbon atoms in the alkyl moieties.

Examples of suitable catalysts are imidazoles, tertiary amines, organic metal salts, peroxides and Bronsted oxo-acids or derivatives thereof, in particular esters thereof, anhydrides, halides or amides, or ammonium salts with nitrogen-containing bases, and Lewis acids or complexes of Lewis acids with bases, in particular with amines.

Examples of suitable imidazoles are 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and adducts of imidazole and trimellitic acid.

Examples of suitable tertiary amines are N,N-dimethylbenzylamine, N,N-dimethylaniline, N,N-dimethyltoluidine, N,N-dimethyl-p-anisidine, p-halo-N,N-dimethylaniline, 2-N-ethylanilinoethanol, tri-n-butylamine, pyridine, quinoline, N-methylmorpholine, triethanolamine, triethylenediamine, N,N,N',N'-tetramethylbutanediamine and N-methylpiperidine.

Examples of suitable organic metal salts are lead naphthenate, lead stearate, zinc naphthenate, zinc octoate, tin oleate, dibutyltin maleate, manganese naphthenate, cobalt naphthenate and acetylacetone-iron.

Examples of suitable peroxides are benzoyl peroxide, lauroyl peroxide, octanoyl peroxide, acetyl peroxide, p-chlorbenzoyl peroxide, di-tertbutyl bisperphthalate, dicumyl peroxide, cyclohexanone peroxide, tertbutyl hydroperoxide and diisopropyl peroxdicarbonate.

Examples of suitable oxo-acids are inorganic or mineral acids or organic acids, for example organic phosphorus-oxygen acids, organic sulfur-oxygen acids or halogenated carboxylic acids.

Examples of suitable mineral acids are perchloric acid, fluorosulfonic acid, chlorsulfonic acid, sulfuric acid, phosphoric acid, polyphosphoric acid, phosphorous acid and hypophosphorous acid.

Examples of suitable organic phosphorus-oxygen acids are phosphonic and phosphinic acids. The respective P-alkyl or P-aryl derivatives are suitable, for example preferably those containing 1 to 6 carbon atoms in the alkyl moieties or 6 to 10 carbon atoms in the aryl moieties, in particular phenylphosphonic and phenylphosphinic acid.

Exmaples of suitable organic sulfur-oxygen acids are aliphatic and, in particular, aromatic sulfonic acids such as methanesulfonic acid, benzenesulfonic acid, naphthalene-2-sulfonic acid or, preferably, p-toluenesulfonic acid.

Examples of suitable halogenated carboxylic acids are chloroacetic acid, dichloroacetic acid, trichloroacetic acid and trifluoroacetic acid.

Examples of suitable Lewis acids are halides of elements from group II, III, IV or V of the periodic table of the elements.

Particularly suitable Lewis acids are iron trichloride, tin tetrachloride, antimony pentafluoride and, in particular, aluminum chloride, zinc chloride, boron trichloride and boron trifluoride.

Complexes of Lewis acids which can be used as catalysts in the mixtures of the invention are for example, the ethylamine/boron trichloride complex, the N,N-dimethyl-n-octylamine/boron trichloride complex, the acetylacetanilide/boron trifluoride complex, the dimethylaniline/boron trichloride complex and the tri-n-octylphosphine/boron trichloride complex.

The amount of catalyst used can be less than 5% by weight, based on the total weight of the curable mixture.

The curing of the mixtures of the invention is normally effected in the temperature range from 150° to 350° C., preferably from 180° to 300° C.

The mixtures of this invention are low melting solid to liquid resins and are distinguished by high reactivity and good mechanical properties of the products cured with them, for example good flexural and shear strength or interlaminary shear strength. Products obtained with them have high glass transition temperatures and are substantially non-brittle. The mixtures of this invention can also be readily applied from the melt, especially without the addition of non-volatile solvents, for example for impregnating glass fibre, carbon fibre or aramide fibre fabrics, such as fabrics made from poly(1,4-phenyleneteraphthalamides) known under the registered trademark Kevlar ®.

The mixtures of this invention have a wide range of utilities, for example as laminating or electrical engineering resins, as high temperature adhesives, or for making coatings or mouldings as coating material, as matrix resins for fibre-reinforced plastics such as prepregs and composites, or as electrical insulating materials.

Acordingly, the invention also relates to moulded articles, coatings or bonds made from the inventive mixture by curing.

The following Examples illustrate the invention in more detail.

PREPARATION OF SPECIFIC STARTING MATERIALS

1. Bis[4-(allylbicyclo[2.2.1]hept-5-ene-2,3-dicarboximidophenyl)]methane (hereinafter referred to as bis(allylnadic)imide I)

102 g of allylbicyclo[2.2.1]hept-5-ene-2,3-dicarboxylic anhydride (prepared in accordance with Example 1 of U.S. Pat. No. 3 105 839) and 198.3 g of 4,4'-diaminophenylmethane in 1000 ml of toluene are heated for 16 hours under reflux in a water separator. The clear reaction solution is concentrated on a rotary evaporator and the residue is dried for 2 hours at 120° C. under a high vacuum, affording 380 g of a reddish yellow resin which is solid at room temperature and has a softening point of 56° C. and a molecular weight of 550 ($\overline{Mn}$) and 571 ($\overline{Mw}$).

| Analysis | % C | % H | % N |
|---|---|---|---|
| calculated for $C_{37}H_{34}N_2O_7$ | 77.87 | 6.01 | 4.91 |
| found | 77.71 | 6.06 | 4.96 |

2. 2,2-Bis(4-cyanatophenyl)propane (hereinafter referred to as bisphenol A dicyanate)

Prepared from bisphenol A and cyanogen bromide in accordance with Example 1 of German Offenlegungsschrift No. 2 529 486.

EXAMPLES 1-3

50 g of bis(allylnadic)imide I, 50 g of bisphenol A dicyanate and 10, 15 or 20 g of the polyether imide ULTEM ® 1000 (commercial product sold by General Electric) are dissolved in 200 g of methylene chloride. The solvent is then removed by distillation on a rotary evaporator at 160° C. The mixture is subsequently heated for 10 minutes to 180° C. and the solvent is removed completely under a high vacuum. The mixtures are cast to sheets measuring 135×135×4 mm, which are cured for 4 hours at 180° C., 1 hour at 200° C., 1 hour at 220° C., and 6 hours at 250° C. The properties of the cured mouldings are indicated in Table I.

EXAMPLE 4

In accordance with the procedure described in Examples 1-3, a mixture of 50 g of bis(allylnadic)imide I, 50 g of bisphenol A dicyanate and 10 g of the polysulfone UDEL ® P1800 (commercial product sold by UCC) is cast to sheets and cured. The properties of the cured sheets are indicated in Table I.

EXAMPLE 5

In accordance with the procedure described in Example 1-3, a mixture of 50 g of bis(allylnadic)imide I, 50 g of bisphenol A dicyanate and 15 g of a polyimide prepared from benzophenonetetracarboxylic dianhydride and phenylindanediamine and containing the following structural unit

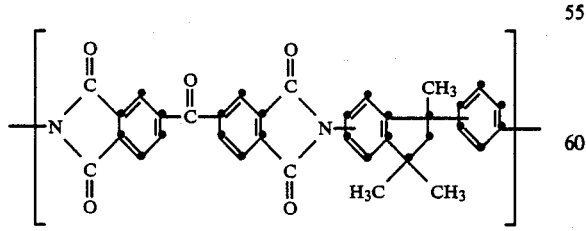

and having an inherent viscosity of 0.84 dl/g, measured at 25° C. in N-methylpyrrolidone, is cast to sheets and cured. The properties of the cured sheets are indicated in Table I.

EXAMPLE 6

50 g of bis(allylnadic)imide I, 50 g of bisphenol A dicyanate and 20 g of the polyether sulfone VICTREX ® 100 (commercial product sold by ICI) are dissolved, with heating, in dimethyl formamide. The bulk of the solvent is removed by distillation at 160° C. under vacuum. The mixture is then heated for 10 minutes to 180° C. and the solvent is completely removed under a high vacuum. The clear, homogenous mixture is cast to sheets, which are cured as described in Example 1. The properties of the cured sheets are indicated in Table I.

TABLE I

| Example | 1 | 2 | 3 | 4 | 5 | 6 |
|---|---|---|---|---|---|---|
| $T_G$ TMA [1] (°C.) | 201;275 | 203;265 | 205;267 | 265 | 276 | 218;275 |
| flexural strength ISO 178 (N/mm²) | 127 | 138 | 156 | 130 | 126 | 147 |
| edge fibre elongation ISO 178 (%) | 4.7 | 5.3 | 7.5 | 5.2 | 4.7 | 7.7 |
| impact flexural strength $G_{IC}$[2] (J/m²) | 130 | 330 | 358 | 174 | 171 | 265 |
| 10% dynamic weight loss[3] at (°C.) | 385 | 385 | 385 | 380 | 385 | 385 |

[1] determined with TMA-943, Dupont 9900 Thermo Analyzer)
[2] Compact Tension Test (ASTM E 399-789), determined with a tensile strength tester ZWICK 1494
[3] heating rate 10° C./min. under nitrogen (determined with TG 50, Mettler TA 3000)

What is claimed is:

1. A heat curable mixture comprising
(a) 5 to 95% by weight of at least one aromatic dicyanate or polycyanate compound or a prepolymer thereof,
(b) 95 to 5% by weight of at least one compound of formula I or II

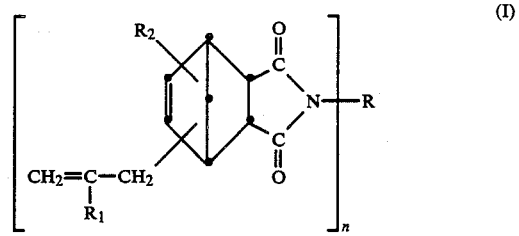

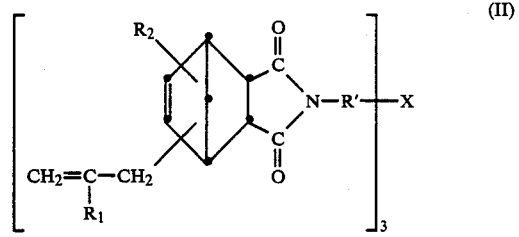

or of a prepolymer of a compound of formula I or II,
(c) 0 to 50% by weight, based on the sum of (a)+(b), of at least one compound of formula III

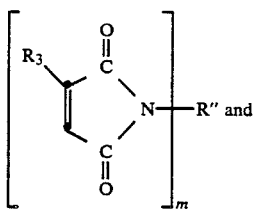
(III)

(d) 0.1 to 50% by weight, based on the sum of (a)+(b), of at least one thermoplastic having a glass transition temperature of at least 120° C., in which formulae above $R_1$, $R_2$ and $R_3$ are each independently of one another a hydrogen atom or methyl, n is 1 or 2 and m is 2 or 3, R, when n is 1, is a hydrogen atom, $C_1$-$C_{12}$alkyl, $C_3$-$C_6$alkenyl, $C_5$-$C_8$cycloalkyl, $C_6$-$C_{10}$aryl or benzyl, or, when n is 2, is —$C_pH_{2p}$, in which p is 2 to 20, $C_6$-$C_{10}$arylene or a group of formula IV

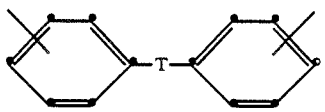
(IV)

wherein T is methylene, isopropylidene, CO, O, S or $SO_2$,

X is

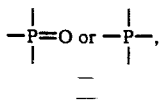

R' is —$C_qH_{2q}$—, in which q is 2 to 20, —$C_rH_{2r}$—O—, in which r is 2 t 6, m- or p-phenylene, m- or p-phenyleneoxy, the oxygen atom being attached to the group X and R" is an organic radical of valency m containing 2 to 30 carbon atoms.

2. A mixture according to claim 1, which contains 20 to 80% by weight of component (a), 80 to 20% by weight of component (b), 0 to 30% by weight of component (c), based on the sum of (a)+(b), and 5 to 40% by weight of component (d), based on the sum of (a)+(b).

3. A mixture according to claim 1, wherein component (a) is a dicyanate compound or a mixture of a dicyanate compound and the corresponding prepolymer.

4. A mixture according to claim 1, wherein component (b) is a compound of formula I, wherein $R_1$ and $R_2$ are each a hydrogen atom and R, if n is 1, is hydrogen, $C_1$-$C_8$alkyl, allyl, cylohexyl, phenyl or benzyl, or, if n is 2, is —$(CH_2)_p$—, in which p is 2 to 12, m- or p-phenylene or a group of formula IV, wherein T is the methylene group, O or $SO_2$.

5. A mixture according to claim 1, wherein component (b) is a compound of formula I, wherein $R_1$ and $R_2$ are each a hydrogen atom and R, when n is 1, is allyl or, when n is 2, is —$(CH_2)_6$—,

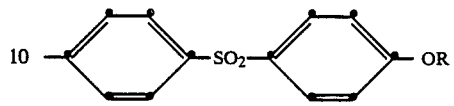

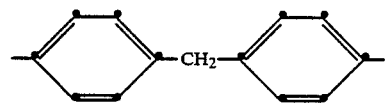

6. A mixture according to claim 1, wherein component (a) is 2,2-bis(4-cyanotophenyl)propane and component (b) is N-allyl allylbicyclo[2.2.1]-hept-5-ene-2,3-dicarboximide, bis[4-allylbicyclo[2.2.1]-hept-5-ene-2,3-dicarboximidophenyl]methane or N,N'-hexamethylene-bis(allylmethylbicyclo[2.2.1]hept-5-ene-2,3-dicarboximide or a mixture of said compounds.

7. A mixture according to claim 1, wherein component (b) is a compound of formula II, wherein X is

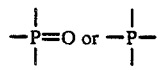

and

R' is —$(CH_2)_q$—, in which q is 2 to 4, m- or p-phenylene or m- or p-phenyleneoxy.

8. A mixture according to claim 1, wherein component (c) is a compound of formula III, wherein m is 2, $R_3$ is a hydrogen atom and R" is —$(CH_2)_p$—, in which p is 2 to 12, m- or p-phenylene, m- or p-xylylene, 1,4-cyclohexylene, 1,4-bis(methylene)cyclohexylene, the radical of 4,4'-bicyclohexylmethane or, a radical of formula

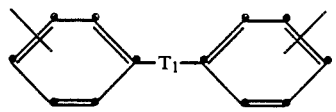

wherein $T_1$ is O, $CH_2$ or $SO_2$.

9. A mixture according to claim 1, wherein component (d) is a thermoplastic having a glass transition temperature in the range fromn 150° to 350° C.

10. A mixture according to claim 1, wherein component (d) is a polyimide, polyether imide or polyether sulfone.

11. A moulding, coating or bond produced from a mixture as claimed in claim 1 by curing.

* * * * *